US009817926B2

(12) United States Patent
Wu

(10) Patent No.: US 9,817,926 B2
(45) Date of Patent: Nov. 14, 2017

(54) MESHFREE METHOD AND SYSTEM FOR NUMERICALLY SIMULATING BRITTLE MATERIAL BASED ON DAMAGE MECHANICS

(71) Applicant: Livermore Software Technology Corporation, Livermore, CA (US)

(72) Inventor: Cheng-Tang Wu, Livermore, CA (US)

(73) Assignee: Livermore Software Technology Corp., Livermore, CA (US)

( * ) Notice: Subject to any disclaimer, the term of this patent is extended or adjusted under 35 U.S.C. 154(b) by 331 days.

(21) Appl. No.: 14/834,598

(22) Filed: Aug. 25, 2015

(65) Prior Publication Data

US 2017/0061042 A1    Mar. 2, 2017

(51) Int. Cl.
G06F 17/50        (2006.01)
(52) U.S. Cl.
CPC ............................. *G06F 17/5009* (2013.01)
(58) Field of Classification Search
USPC ....................................................... 703/2, 12
See application file for complete search history.

(56) References Cited

U.S. PATENT DOCUMENTS 9,259,287 B2 *   2/2016   Mansi .................... A61B 19/50
2015/0112653 A1    4/2015   Wu

OTHER PUBLICATIONS

S. Beissel, T. Belytschko, Nodal integration of the element-free Galerkin method. Comput. Methods Appl. Mech. Engrg. 139 (1996) 49-74.
J.S. Chen, C.T. Wu, T. Belytschko, Regularization of material instabilities by meshfree approximations with intrinsic length scales, Int. J. Nurner. Methods Engrg. 47 (2000) 1303-1322.
J.S. Chen, X. Zhang, T. Belytschko, An implicit gradient model by a reproducing kernel strain regularization in strain localization problems, Comput. Methods Appl. Mech. Engrg. 193 (2004) 2827-2844.
C.T. Wu, C.K. Park, J.S. Chen, A generalized approximation for the meshfree analysis of solids, Int. J. Numer. Methods Engrg. 85 (2011) 693-722.

(Continued)

*Primary Examiner* — Thai Phan
(74) *Attorney, Agent, or Firm* — Roger H. Chu

(57) ABSTRACT

Meshfree model containing a number of particles to represent a structure made of brittle material is defined. At each non-initial solution cycle of a numerical simulation using the meshfree model based on damage mechanics, the following operations are performed: (a) determining one or more damage zones in the structure from simulated structural responses obtained in immediate prior solution cycle; (b) dividing the particles into a first group representing the damage zones and a second group representing the remaining of the meshfree model; (c) applying a meshfree regularization scheme by modifying each particle's strain field of the first group with a morphing function that ensures a homogeneous jump condition along respective borders of the damage zones; and (e) obtaining simulated structural behaviors of the structure using a meshfree stabilization scheme that applies to all of the particle's strain field. Each damage zone represents a crack that can grow over time.

18 Claims, 7 Drawing Sheets

Dual stress points    Stress point for regularization    Stress point for stabilization

(56) References Cited

OTHER PUBLICATIONS

C.T. Wu, B. Ren, A stabilized non-ordinary state-based peridynamics for the nonlocal ductile material failure analysis in metal machining process, Comput. Methods Appl. Mech. Engrg. 291 (2015) 197-215.
R.H.J. Peerlings, R. de Borst, W.A.M. Brekelmans, M.G.D. Geers, Localization issues in local and nonlocal continuum approaches to fracture, Eur. J. Mech. A/Solids 21(2002) 175-189.
C.T. Wu, Y. Guo, W. Hu, An introduction to the LS-DYNA smoothed particle Galerkin method for severe deformation and failure analysis in solids. 13th International LS-DYNA Users Conference, Detroit, MI, Jun. 8-10, 2014,1-20.

\* cited by examiner $\varepsilon = \delta / L$ $\sigma = P / A$

MESHFREE METHOD AND SYSTEM FOR NUMERICALLY SIMULATING BRITTLE MATERIAL BASED ON DAMAGE MECHANICS

FIELD

The present invention generally relates to computer aided engineering analysis (e.g., finite element analysis, meshfree or particle method, etc.), more particularly to meshfree method and system for obtaining numerically simulated structural behaviors of brittle material based on damage mechanics.

BACKGROUND

Meshfree, or particle methods, offer many numerical advantages over conventional finite element and finite difference methods in modeling large deformation and moving discontinuity problems in solid and structural applications. Those methods were also found to be very effective in reducing the volumetric locking and shear locking in the solid and structural analyses. The earliest development in meshfree methods was the Smoothed Particle Hydrodynamics (SPH) method or one of the Galerkin-based meshfree methods. In this method, partial differential equations are transformed into integral equations and the kernel estimate then provides the approximation to estimate the field variables at discrete particles. Since the functions are evaluated only at particles, the use of a mesh is no longer required. The ability to handle severe deformations without the use of meshes in fluid-like motion allows SPH method to be applied to problems that historically have been reserved for Eulerian approaches.

Numerical simulation of a structure made of brittle material subjected to cracks is one of the computational challenges when using Galerkin-based meshfree methods. Local and non-local strain fields are simultaneously presented in a meshfree model as a result of cracks in the structure. Other challenges such as the presence of spurious or zero-energy modes in SPH or other Galerkin-based meshfree methods also exist due to the rank instability caused by the underintegration of the weak forms inherent in the central difference formula from nodal integration approach. Prior art approaches have been ad hoc and sometimes ineffective.

Therefore, it would be desirable to have improved meshfree methods of obtaining numerically simulated structural behaviors of brittle material based on damage mechanics.

BRIEF SUMMARY

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

Methods and systems for obtaining structural behaviors of brittle material based on damage mechanics are disclosed. According to one aspect, a meshfree model containing a number of particles to represent a structure made of brittle material subjected to cracks is defined and received in a computer system having a meshfree-method application module installed thereon. A numerical time-marching simulation based on damage mechanics is then conducted by the meshfree-method application module for a plurality of solution cycles using the meshfree model. At each non-initial solution cycle, the following operations are performed: (a) determining one or more damage zones in the structure from simulated structural responses obtained in immediate prior solution cycle; (b) dividing the particles into a first group representing the damage zones and a second group representing the remaining of the meshfree model; (c) applying a meshfree regularization scheme by modifying each particle's strain field of the first group with a morphing function that ensures a homogeneous jump condition along respective borders of the damage zones; and (e) obtaining simulated structural behaviors of the structure using a meshfree stabilization scheme that applies to all of the particle's strain field. Each damage zone represents a crack that can grow over time.

Objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

DETAILED DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to figures. However, those skilled in the art will readily appreciate that the detailed description given herein with respect to these figures is for explanatory purposes as the invention extends beyond these limited embodiments.

Figure 1:
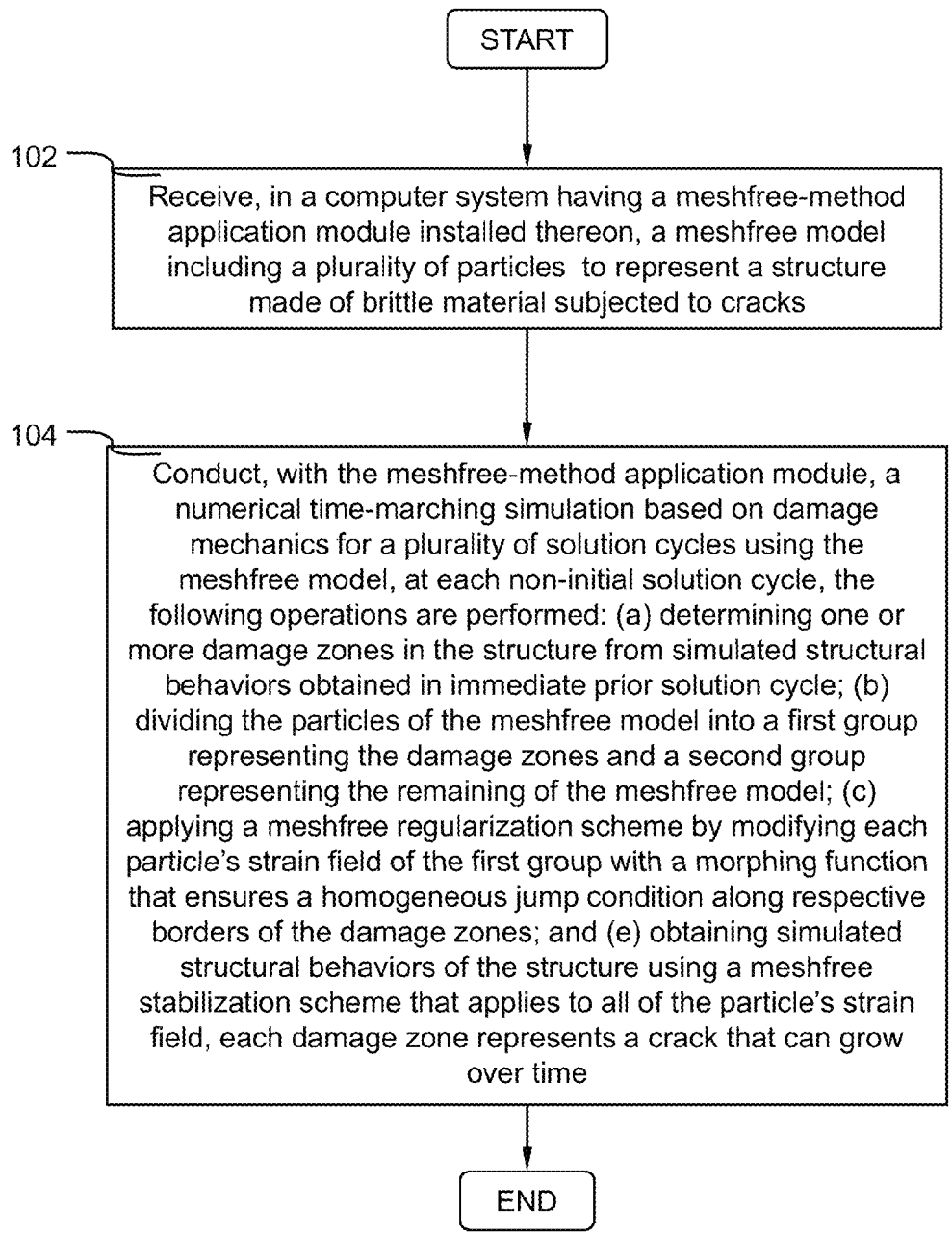
FIG. 1 is a flowchart illustrating an example process of obtaining numerically simulated structural behaviors of brittle material based on damage mechanics in accordance with an embodiment of the present invention.

Referring first to FIG. 1, a flowchart illustrating an example process 100 of obtaining numerically simulated structural behaviors based on damage mechanics in accordance with one embodiment of the present invention. Process 100 may be implemented with various schemes, for example, software. Process 100 can be understood with other figures in this document.

Figure 2:
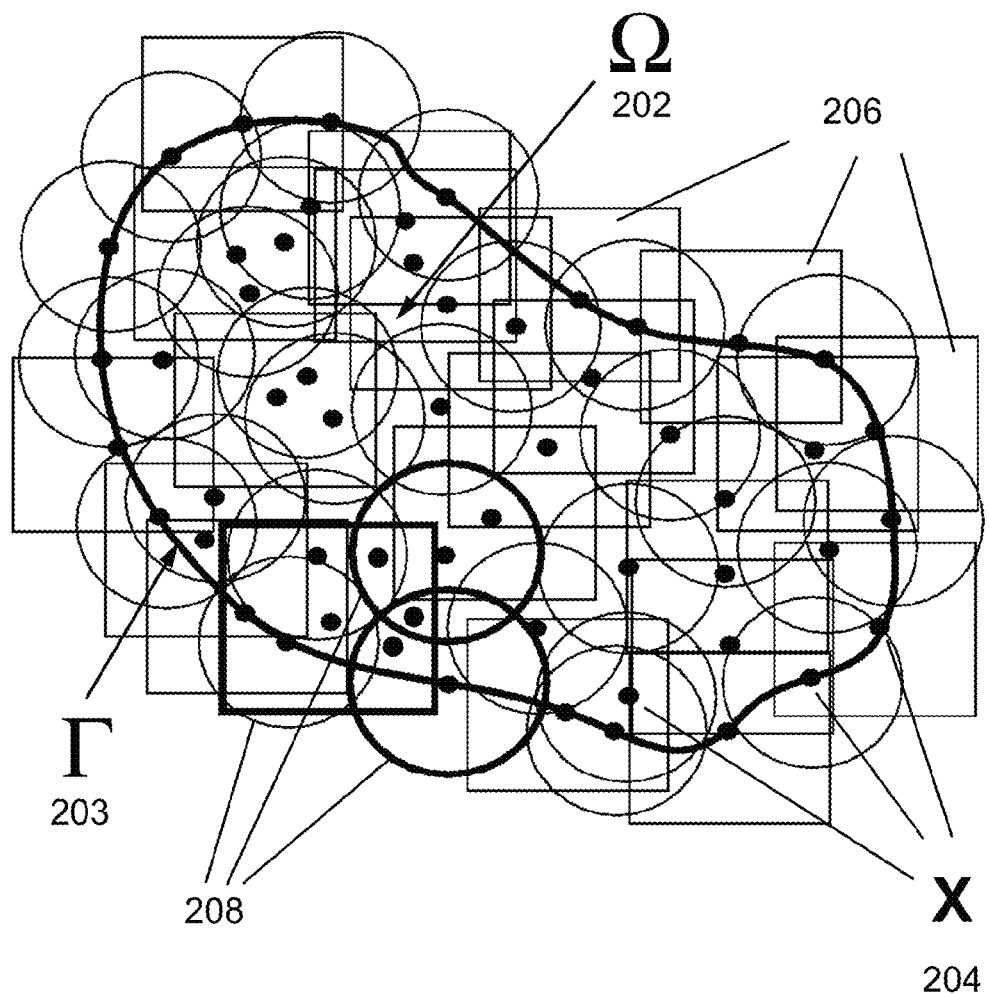
FIG. 2 is a diagram showing an example two-dimensional structure represented by particles in accordance with one embodiment of the present invention.

Process 100 starts at action 102 by receiving a meshfree model containing a plurality of particles to represent a structure subjected to cracks in a computer system (e.g., computer 700 of FIG. 7) having a meshfree-method application installed thereon. The meshfree-method application module is configured to perform a time-marching simulation based on smoothed particle Galerkin formulation. An example meshfree model 200 is shown in FIG. 2, in which an example two-dimensional structure Ω 202 and the corresponding boundary or border Γ 203 are depicted. To represent the structure 202, a plurality of particles 204 are used. The particles 204 representing the structure 202 do not have a particular pattern. They may be regularly spaced or arbitrarily located. These particles may be located in the interior or on the border 203 of the structure 202. Each of the particles 204 contains a domain of influence or support. The domain of influence and the support are used interchangeably hereinafter. The size and shape of the support for each particle are also arbitrary. In one embodiment, the shape of the support is quadrilateral 206. In another embodiment, the shape is circular 208. In the case of three-dimensional support, the shape of the support may be spherical in that embodiment. In yet another embodiment, the size and the shape of each particle are different. One particle may have a one square foot support while another particle may have a 16-in radius circular support in the same model. In still another embodiment, the support is not a regular geometric shape. It can be any arbitrary shape. The present invention can support all different combinations.

Figure 3A:
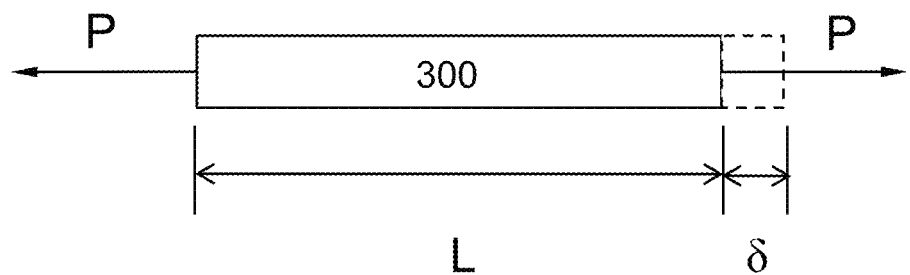
FIG. 3A-3B are diagrams showing definition of strain and stress of an example structure (i.e., a prismatic bar)
Figure 3B:
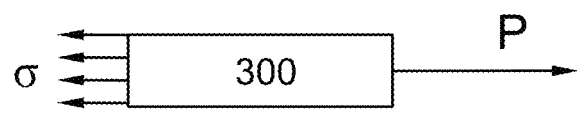
Figure 4:
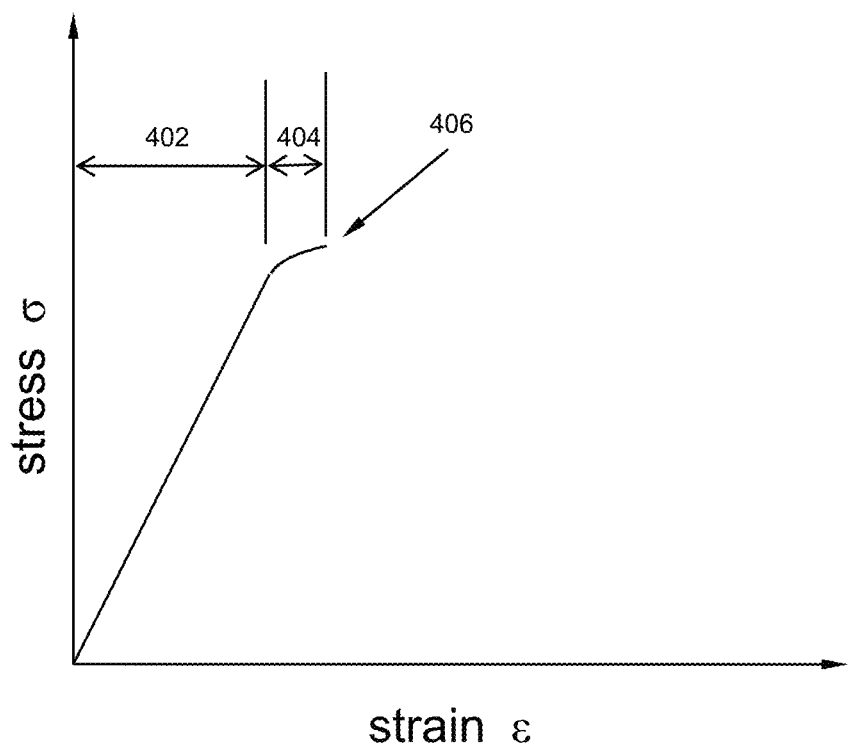
FIG. 4 is a diagram showing an example stress-strain relationship of brittle material in accordance with one embodiment of the present invention.

FIGS. 3A and 3B show definition of strain and stress of an example structure (i.e., a prismatic bar 300). The prismatic bar 300 has a constant cross section throughout its length in a straight axis. The prismatic bar 300 has a length L and cross-sectional area A and is under constant tension P. As a result of the constant tension P, the prismatic bar 300 is stretched elastically to L+δ. δ is the total elongation. Strain ϵ is defined as the elongation per unit length, i.e., ϵ=δ/L. Stress σ is defined as the intensity of force or the force per unit area, i.e., σ=P/A. Structural behaviors of a structure can be shown as the relationship between strains and stresses. For example, a stress-strain relationship (not to scale) of brittle material is illustrated in FIG. 4. In the linear zone 402, there is no damage. At the end of damage zone 404, the brittle material fails with a crack 406.

Next, at action 104, a numerical time-marching simulation to obtain structural behaviors based on damage mechanics is then conducted with the meshfree-method application module for a plurality of solution cycles using the meshfree model. At each non-initial solution cycle, the following operations are performed: (a) determining one or more damage zones in the structure from simulated structural responses obtained in immediate prior solution cycle; (b) dividing the particles into a first group representing the damage zones and a second group representing the remaining of the meshfree model; (c) applying a meshfree regularization scheme by modifying each particle's strain field of the first group with a morphing function that ensures a homogeneous jump condition along respective borders of the damage zones; and (e) obtaining simulated structural behaviors of the structure using a meshfree stabilization scheme that applies to all of the particle's strain field. Each damage zone represents a crack that can grow over time.

Details of obtaining simulated structural behaviors are described below:

Overview on Non-Local Strain and Damage Model

The basis for damage model is the introduction of a local damage variable impacting the stiffness of the material. As a prototype of a softening continuum, the scalar isotropic damage model described by the stress-strain relationship is as follows:

$$\sigma = (1-d)C:\epsilon \quad (1)$$

with damage law defined in total form $$d = g(\kappa) \quad (2)$$

and Kuhn-Tucker loading-unloading conditions $$f(\epsilon,\kappa) \equiv \epsilon_{eq}(\epsilon) - \kappa \leq 0, \dot{\kappa} \geq 0, f(\epsilon,\kappa)\dot{\kappa} = 0 \quad (3)$$

where ϵ is the strain tensor, σ is the Cauchy stress tensor, d is the damage variable and C is the fourth-order elasticity tensor. Function g is the damage evolution function which is a continuous function and designed such that d=0 for the internal valuable κ below a certain threshold, $\kappa^0$. A simple equivalent strain $\epsilon_{eq}$ can be defined as:

$$\varepsilon_{eq} = \sqrt{\frac{1}{E}\varepsilon:C:\varepsilon} \quad (4)$$

where E denotes the Young's modulus.

The implementation of above damage model causes the pathological localization of deformation in finite element method as well as in Galerkin meshfree method. As a result, the damage concentrates in a band of width depending on the size of nodal spacing in meshfree discretization, and the meshfree solution does not converge as the discretization model is continuously refined.

A number of non-local approaches have been proposed to regularize the soften media and control the localization phenomenon of the underlying continuum theory. One of the simple but effective approaches is to introduce an integral-type of non-local strain into the local damage model. In this integral-type damage model, the growth of damage in a material point x is governed by a non-local equivalent strain $\tilde{\epsilon}_{eq}$ which is defined by $$\tilde{\epsilon}_{eq}(x) = \int_\Omega \Psi^b(x-\xi)\epsilon_{eq}(\xi)d\Omega \quad (5)$$

where $\Psi^b(x-\xi)$ is the non-negative smoothing function of the distance $\|x-\xi\|$ and the subscript b denotes the radius of support in the strain smoothing function. With this non-local equivalent strain measure, the corresponding loading condition in Eq. (3) becomes $$f(\tilde{\epsilon},\kappa) \equiv \tilde{\epsilon}_{eq}(\epsilon) - \kappa \leq 0 \quad (6)$$

The numerical advantage of this approach is that the kinematic and equilibrium equation remain standard. On the other hand, the material damage model in this approach needs to be modified accordingly to take into the effect of non-local equivalent strain.

Another approach without a need of modification of the constitutive law is to construct a generalized kinematic relation based on the non-local strain. The smoothing function was built by the reproducing kernel approximation and was applied to local strain field $\epsilon$ instead of local equivalent strain $\epsilon_{eq}$. The resultant non-local strain field was introduced to the Galerkin approximation of the weak form solution through an assumed strain method. The attendant regularization approach significantly reduces code complexity associated with the variety of material damage models. Nevertheless the rendered non-local strain field is imposed on the entire domain; therefore, the solution of boundary value problem in the undamaged part is considered non-local.

Local and Non-Local Morphed Strain Fields Based on the Smoothed Strain Decomposition The concept of strain gradient stabilization is extended to cover the stabilization and regularization effects through a strain morphing scheme for the strain localization analysis. Since the formulation of higher-order strain gradients for regularization based on the displacement smoothing approach is more difficult to be implemented than that by the strain smoothing approach, the later approach is considered in this study. The general form of smoothed strain field in meshfree method is defined by $$\bar{\epsilon}^b(x) = \Theta \epsilon(x) \overset{def}{=} \int_\Omega \tilde{\Psi}^b(x; x-\xi)\epsilon(\xi)d\Omega, \quad (7)$$

$$x \in \Omega \subseteq R^2$$

where $\Theta: L^2(\Omega) \to L^2(\Omega)$ denotes a $L_2$ projection operator, $\xi$ denotes the position of the infinitesimal volume $d\Omega$, $\epsilon(\xi)$ is a local strain at position $\xi$ produced by the meshfree direct nodal integration method. $\tilde{\Psi}^b$ is the strain smoothing function, $\tilde{\Psi}^b(r)>0$ for $\|r\|<b$, $\tilde{\Psi}^b(r)=0$ for $\|r\|\geq b$, and subscript b denotes the radius of influence domain similar to that in Eq. (6). It is assumed that strain smoothing function is continuous in $\Omega$ and satisfies the partition of unity property for the reproduction of constant strain field. The strain $\epsilon(\xi)$ inside the integral of Eq. (7) can be further expressed in terms of $\epsilon(x)$ and its gradients by the Taylor series expansions:

$$\epsilon(\xi) = \epsilon(x) + \nabla \epsilon(x) \cdot (\xi - x) + \frac{1}{2!}\nabla^{(2)}\epsilon(x) \cdot^{(2)} (\xi - x)^2 + O(\|\xi - x\|^3) \quad (8)$$

where $\nabla^{(2)}$ denotes the 2nd order gradient operator and $\cdot^{(2)}$ denotes the 2nd order inner product. The symbol $(\zeta)^{(n)}$ designates the n factor dyadic product $(\zeta)(\zeta) \ldots (\zeta)$ for vector $\zeta$. Substituting Eq. (8) into Eq. (7) leads to the following smoothed strain field approximated in terms of unsmoothed (local) strain and its gradients $$\bar{\epsilon}^b(x) = \int_\Omega \tilde{\Psi}^b(x; x-\xi)\epsilon(x)d\Omega + \int_\Omega \tilde{\Psi}^b(x; x-\xi)\nabla \epsilon(x)(\xi - x)d\Omega + \quad (9)$$

$$\frac{1}{2!}\int_\Omega \tilde{\Psi}^b(x; x-\xi)\nabla^{(2)}\epsilon(x) \cdot^{(2)} (\xi - x)^2 d\Omega + h \cdot o \cdot t =$$

$$\epsilon(x)\int_\Omega \tilde{\Psi}^b(x; x-\xi)d\Omega + \nabla \epsilon(x) \cdot \left(\int_\Omega \tilde{\Psi}^b(x; x-\xi)(\xi - x)d\Omega\right) +$$

$$\nabla^{(2)}\epsilon(x) \cdot^{(2)} \left(\frac{1}{2!}\int_\Omega \tilde{\Psi}^b(x; x-\xi)(\xi - x)^2 d\Omega\right) + h \cdot o \cdot t =$$

$$\epsilon(x) + \nabla \epsilon(x) \cdot \lambda^b(x) + \nabla^{(2)}\epsilon(x) \cdot^{(2)} \eta^b(x) + h \cdot o \cdot t$$

where $$\lambda^b(x) = \int_\Omega \tilde{\Psi}^b(x; x-\xi)(\xi - x)d\Omega \quad (10)$$

$$\eta^b(x) = \frac{1}{2!}\int_\Omega \tilde{\Psi}^b(x; x-\xi)(\xi - x)^{(2)} d\Omega \quad (11)$$

$\lambda^b(x)$ and $\eta^b(x)$ define the smoothed position dependent coefficients associated with the first-order and second-order strain gradient, respectively. Similar to the stabilization term, the first-order strain gradient term $\nabla\epsilon(x) \cdot \lambda^b(x)$ contains the second-order displacement gradients that can be used for the stabilization of meshfree nodal integration method.

Analogously, another strain smoothing for regularization is listed as follows:

$$\bar{\epsilon}^c(x) \approx \epsilon(x) + \nabla \epsilon(x) \cdot \lambda^c(x) + \nabla^{(2)}\epsilon(x) \cdot^{(2)} \eta^c(x) + h \cdot o \cdot t \quad (12)$$

where $$\lambda^c(x) = \int_\Omega \tilde{\Psi}^c(x; x-\xi)(\xi - x)d\Omega \quad (13)$$

$$\eta^c(x) = \frac{1}{2!}\int_\Omega \tilde{\Psi}^c(x; x-\xi)(\xi - x)^{(2)} d\Omega \quad (14)$$

The second-order strain gradient term $\nabla\epsilon(x) \cdot \eta^c(x)$ contains the third-order displacement gradients which will be used for the regularization. And $\tilde{\Psi}^b(x)$ in Eq. (9) does not necessary equal to $\tilde{\Psi}^c(x)$ in Eq. (12). In essence, the radius size b of $\tilde{\Psi}^b(x)$ can be considered a numerical length parameter for stabilization while the radius size c of $\tilde{\Psi}^c(x)$ is a material length parameter which can be related to the scale of the microstructure in strain localization problem. Both Eqs. (9) and (12) contain same local strain field $\epsilon(x)$ but different coefficients in strain gradient terms when sizes $b \neq c$.

The damage value is bounded by d<1 in Eq. (1) for the weak-discontinuity approach such that the fully damage (d=1) does not occur. This is because the equivalent problem is defined only when $0 \leq d < 1$. If d=1 is allowed in the damage model, the displacement discontinuities will be initiated due to the loss of ellipticity of the rate equilibrium equations. As a result, a crack will be formed and a strain singularity will thus be unavoidable at the crack tip. The transition of material degradation from damage (0<d<1) to fracture (d=1) is not considered and the singular strains/stresses fields near the tip of damage band are not modeled. Under this condition, a damage zone is defined as follows:

$$\Omega_c = \{x \in \Omega | 0 < d(x) < 1\} \subset \Omega \quad (15)$$

In the damage zone $\Omega_c$, the discrete non-local strain field is formulated by truncating the higher-order strain gradients such that $$\overline{\Theta}_h \varepsilon^c(x) \equiv \underbrace{\varepsilon(x)}_{local} + \underbrace{\bar{\varepsilon}^c(x)}_{stabilization} + \underbrace{\tilde{\varepsilon}^c(x)}_{regularization} = \quad (16)$$

$$\underbrace{\underbrace{\varepsilon(x) + \tilde{\varepsilon}^c(x)}_{local} + \underbrace{\bar{\varepsilon}^c(x)}_{stabilization}}_{non-local} \forall x \in \Omega_c$$

where $$\bar{\varepsilon}^c(x) = \nabla \varepsilon(x) \cdot \left( \int_\Omega \Psi^c(x; x-\xi)(\xi-x) d\Omega \right) \quad (17)$$

$$\tilde{\varepsilon}^c(x) = \nabla^{(2)} \varepsilon(x) \cdot^{(2)} \left( \frac{1}{2!} \int_\Omega \Psi^c(x; x-\xi)(\xi-x)^{(2)} d\Omega \right) \quad (18)$$

$\tilde{\varepsilon}^c$ corresponds to the term that contains the second-order derivatives of displacements for the stabilization of the meshfree nodal integration solution. The term $\tilde{\varepsilon}^c$ contains the third-order derivatives of displacements and is introduced for the regularization of the meshfree nodal integration solution in damage-induced strain localization problem. The second-order strain gradient $\tilde{\varepsilon}^c$ brings in the non-locality into the analysis of strain localization problem, which resembles the standard second-order derivative of strains in the gradient-type damage model.

Analogously, the stabilized local strain field in undamaged zone is approximated by $$\overline{\Theta}_h \varepsilon^b(x) = \underbrace{\varepsilon(x)}_{local} + \underbrace{\bar{\varepsilon}^b(x)}_{stabilization} \forall x \in \Omega_b \quad (19)$$

The undamaged zone can also be defined as $\Omega_b = \{x \in \Omega | d(x)=0\}$ such that $\Omega = \Omega_b \cup \Omega_c$ and $\Gamma_d = \Omega_b \cap \Omega_c$. $\Gamma_d$ is a moving interface which travels with the evolution of damage. Having imposed the displacement continuity due to the kinematic requirement in the weak-discontinuity approach, the jump of displacement derivatives along the moving interface must vanish to follow the Hadamard Lemma as a kinematic compatibility condition. To couple the non-local model of Eq. (16) and local model of Eq. (19) as a continuum model is the regularization of solution to strain localization.

According to one embodiment, particles in a meshfree model are divided into two groups. The first group represents the damage zone 502 $\Omega_c$ while the second group represents the remaining of the particles (i.e., undamaged zone 504 $\Omega_b$).

A direct coupling method introduces the discontinuities in strains along their border 510 or bounding interface $\Gamma_d$ as $$[[\epsilon]]_{\Gamma_d} = \overline{\Theta}_h \epsilon^c(x) - \overline{\Theta}_h \epsilon^b(x) = \bar{\epsilon}^c(x) + \tilde{\epsilon}^c(x) - \bar{\epsilon}^b(x) \neq 0 \text{ for } x \in \Gamma_d \quad (20)$$

and $$[[\epsilon]]_{\Gamma_d} \cdot m \neq 0 \text{ for } x \in \Gamma_d \quad (21)$$

which implies the violation of Hadamard kinematic compatibility condition. m is the surface normal at $x \in \Gamma_d$.

A continuum coupling model is presented in this study by incorporating a morphing function $\pi(x)$ in Eq. (16), such that $$\overline{\Theta}_h \varepsilon^c(x) \equiv \underbrace{\varepsilon(x)}_{local} + \underbrace{\bar{\varepsilon}^b(x)}_{stabilization} + \underbrace{\pi(x)\tilde{\varepsilon}^c(x)}_{regularization} = \quad (22)$$

$$\underbrace{\underbrace{\varepsilon(x) + \pi(x)\tilde{\varepsilon}^c(x)}_{local} + \underbrace{\bar{\varepsilon}^b(x)}_{stabilization}}_{non-local} \forall x \in \Omega_c$$

and $$\overline{\Theta}_h \varepsilon^c(x) = \overline{\Theta}_h \varepsilon^b(x) \quad (23)$$

for $$x \in \Gamma_d$$

where $\tilde{\varepsilon}^c$ in Eq. (16) is replaced by $\tilde{\varepsilon}^b$ in Eq. (22), i.e. $\bar{\epsilon}^c(x) = \bar{\epsilon}^b(x) \forall x \in \Omega_c$, for the stabilization. This numerical adjustment is to ensure the stabilization strain is continuous across the interface $\Gamma_d$. The continuity of stabilization strain field is automatically satisfied in the meshfree direct nodal integration method as the nodal radius size of stabilization smoothing domain is a unique value along the interface $\Gamma_d$. Clearly, the morphing function $\pi(x)$ has to be continuous within damage zone $\Omega_c$ and satisfies $\pi(x)=0 \forall x \in \Gamma_d$ and $0 \leq \pi(x) \leq 1 \forall x \in \Omega_c$. Combination of Eqs. (22) and (23) gives $$\pi(x)\tilde{\varepsilon}^c(x)=0 \forall x \in \Gamma_d \quad (24)$$

There are many possible choices for the determination of morphing function. In one embodiment, the morphing function $\pi(x) \in C^2(\Omega_c)$ is a cubic spline function in terms of monotone non-decreasing damage valuable $d(x)$ and it is given by $$\pi(x) = \begin{cases} 1 - \left(1 - \frac{3}{2}\xi^2(x)\left(1 - \frac{\xi(x)}{2}\right)\right) & \text{if } 0 \leq \xi(x) < 1 \\ 1 + \frac{1}{4}(\xi(x)-2)^3 & \text{if } 1 \leq \xi(x) < 2 \\ 0 & \text{otherwise} \end{cases} \quad (25)$$

where $0 \leq \xi(x) = 2d(x) < 2, \forall x \in \Omega_c$

With the above morphing function, the result of Eq. (24) yields the following homogenous jump condition in strains $$[[\epsilon]]_{\Gamma_d} = \overline{\Theta}_h \epsilon^c(x) - \overline{\Theta}_h \epsilon^b(x) = 0 \text{ for } x \in \Gamma_d \quad (26)$$

thus $[[\epsilon]]_{\Gamma_d} \cdot m = 0$ for $x \in \Gamma_d$, and the Hadamard kinematic compatibility condition is verified as a consequence. Therefore, $[[\sigma]]_{\Gamma_d} = 0$ for $x \in \Gamma_d$.

Figure 5:
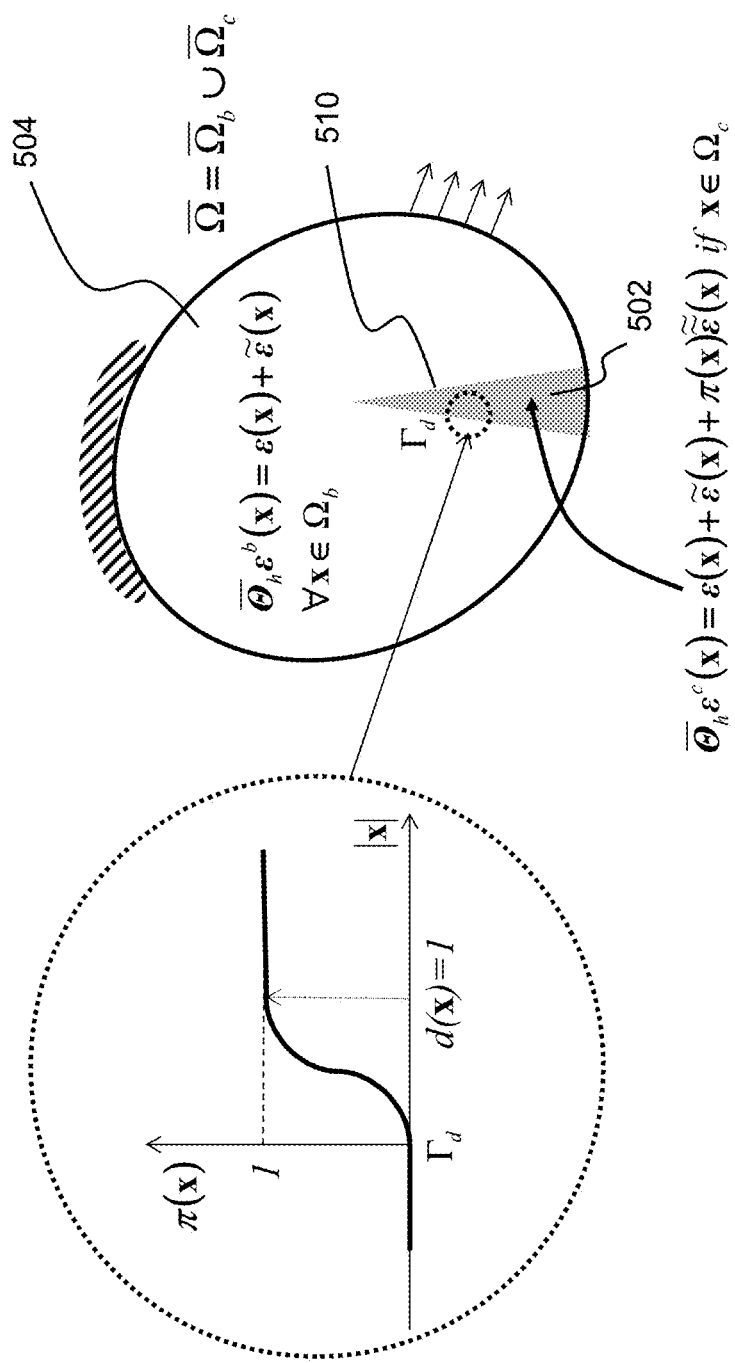
FIG. 5 is a diagram of an example meshfree morphing model for local and non-local strain approximations in accordance with one embodiment of the present invention.

The homogenous jump conditions in strains and stresses present a strong compatibility between the local and non-local strain models. This result indicates the weak discontinuity of displacement derivatives across the interface $\Gamma_d$ is smeared by the introduced morphing function, and the energy dissipation generated by the movement of interface is zero. The coupling of local and non-local strain models is illustrated in FIG. 5.

Variational Formulation and Discrete Equations

To introduce the stabilization and regularization strain fields into the Galerkin method, the strain gradient stabilization (SGS) method in linear elasticity analysis is chosen in which the penalty approach was adopted to introduce the stabilization strain field into the variational formulation. Since the stabilization term in SGS method does not involve the third-order derivatives of displacements (or second-order of strains), the resultant penalty formulation in Smoothed Particle Galerkin (SPG) method can only be considered as a local strain approach. Assuming the homogenous Dirichlet problem for simplicity, the discrete SPG penalty problem in liner elasticity analysis is to find $\hat{u}^p \in V^h \subseteq H_0^1(\Omega)$ such that $$\Pi(\hat{u}^p) = \inf_{\hat{u} \in V^h} \Pi(\hat{u}) \quad (28)$$

-continued $$\Pi(\hat{u}) = \Pi(\hat{u}) + \frac{1}{2}s(\hat{u}, \hat{u}) \tag{29}$$

where $$\Pi(\hat{u}) = a^h(\hat{u}, \hat{u}) + l(\hat{u}) \tag{30}$$

$$a^h(\hat{u}, \hat{u}) = \int_\Omega (\varepsilon(\hat{\mu}))^T : C : (\varepsilon(\hat{\mu})) \, d\Omega \tag{31}$$

$$s^h(\hat{u}, \hat{u}) = \int_\Omega (\bar{\Theta}_h \varepsilon^b(\hat{u}) - \varepsilon(\hat{\mu}))^T : C : (\bar{\Theta}_h \varepsilon^b(\hat{u}) - \varepsilon(\hat{\mu})) d\Omega \tag{32}$$

$$= \int_\Omega (\nabla \varepsilon(\hat{u}) \cdot \lambda)^T : C : (\nabla \varepsilon(\hat{u}) \cdot \lambda) d\Omega$$

The subspace $V^h$ is defined by $$V^h(\Omega) = \{v : v|_\Omega \in H^1(\Omega), v = 0 \text{ on } \partial\Omega\} \tag{33}$$

For a particle distribution noted by an index set $Z_I = \{x_I\}_{I=1}^{NP}$, we approximate the displacement field using the meshfree approximation to give $$u^h(x) = \sum_{I=1}^{NP} \phi_I^a(x) \tilde{u}_I \equiv \hat{u}(x) \; \forall \, x \in \Omega \tag{34}$$

where NP is the total number of particles in discretization. $\phi_I^a(x)$, I=1, . . . NP can be considered as the shape functions of the meshfree approximation for displacement field $u^h(x)$. The radius size a of $\phi_I^a(X)$ is a numerical length parameter in meshfree displacement approximation and usually a≠b (for stabilization) ≠c (for regularization). In general, $\tilde{u}_I$ is not the physical particle displacement and is often referred to as the "generalized displacement" of particle I in meshfree Galerkin method. As a result, special essential boundary condition treatment is needed. To simplify the enforcement of essential boundary condition in this study, a first-order meshfree convex approximation is considered. They are constructed by the Generalized Meshfree Approximation (GMF) method. With the meshfree convex approximation, we can define the $H_0^1$-conforming subspace for the approximation of displacement field to be $$V^h := \text{span}\{\phi_I^a | (\text{supp } \phi_I^a)^0 \subset \Omega, \, I \in Z_I\} \tag{35}$$

Since the stabilization coefficient $\lambda^b$ has the property, $|\lambda^b(x)| \propto h$ where h denotes the size of nodal spacing in meshfree discretization, the solution of Eq. (28) is subjected to a $O(h^2)$ penalty error. The above discrete weak form for linear elasticity can be extended to cover the nonlinear cases through an updated Lagrangian formulation with reference to the current configuration in the damage analysis:

$$\delta \overline{A} = \int_\Omega \delta(\varepsilon(\hat{u}))^T : \sigma(d) d\Omega + \int_\Omega \delta(\bar{\Theta}_h \varepsilon^b(\hat{u}) - \varepsilon(\hat{u}))^T : \tilde{\sigma}(d) d\Omega - l^{ext}(\hat{u}) \tag{36}$$

where σ is the local Cauchy stress obtained by direct nodal integration scheme and $\tilde{\sigma}$ is the enhanced stress field for stabilization. Both stress quantities are defined at the current configuration Ω. $l^{ext}$ corresponds to the nonlinear version of external work in Eq. (30). The enhanced stress field for stabilization in the nonlinear analysis is obtained by replacing the elastic tensor C using a material response tensor (elasto-damage tangent modulus) $C^\sigma$ as $$\tilde{\sigma}(d) = C^\sigma(d) : (\bar{\Theta}_h \varepsilon^b(\hat{u}) - \varepsilon(\hat{u})) \tag{37}$$

Eq. (37) indicates that the enhanced stresses are related to the first-order special derivatives of strains through the elasto-damage tangent modulus. We assume the deformation is small and the elasto-damage model does not involve geometric non-linearity. The linearization of Eq. (36) with a neglect of non-linear contribution in the nodal strain and enhanced strain fields yields $$\Delta \delta \Pi = \int_\Omega \delta(\varepsilon(\hat{u}))^T : (C^\sigma(d)) : \Delta(\varepsilon(\hat{u})) d\Omega + \int_\Omega \delta( \bar{\Theta}_h \varepsilon^b(\hat{u}) - \varepsilon(\hat{u}))^T : C^\sigma(d) : \Delta(\bar{\Theta}_h \varepsilon^b(\hat{u}) - \varepsilon(\hat{u})) d\Omega - \Delta l^{ext} \tag{38}$$

Considering that the Lagrangian meshfree shape function and the gradients of displacement and strain approximations are defined in the un-deformed configuration, the variation equation of Eq. (38) is transformed from the current configuration Ω to the un-deformed configuration $\Omega^0$ as $$\Delta \delta \Pi = \int_{\Omega^0} \delta(F^{-1}\varepsilon)^T : (C^\sigma(d)) : \Delta(F^{-1}\varepsilon) J^0 d\Omega + \tag{39}$$

$$\int_{\Omega^0} \delta(F^{-1}\tilde{\varepsilon})^T : C^\sigma(d) : \Delta(F^{-1}\tilde{\varepsilon}) J^0 d\Omega - \Delta l^{ext}$$

$$F_{ij}(X) = \frac{\partial x_i(X)}{\partial X_j} = \sum_{I=1}^{NP} \frac{\partial \phi^a(X)}{\partial X_j} x_{Ii} \tag{40}$$

where F is the deformation gradient, $x_{Ii}$ denotes the i-component of current position at node I, and $X = [X, Y]^T$ is a position vector defined in the un-deformed configuration. $J^0$ is the determinant of the deformation gradient. Without the incorporation of regularization strain field, Eq. (39) represents a case of local model where the stress at a given point is assumed to be uniquely determined by the strain history at this point. As damage-induced strain field localizes over narrow zones of a continuum, statistical homogeneity in a representative material volume is lost. This local form of quasi-static meshfree formulation in Eq. (39) will exhibit the pathological localization of deformation and requires regularization.

To introduce the regularization strain field to the local strain in $\Omega_c$, the assumed strain method is considered. With the regularization term in Eq. (22) and the homogenous jump condition of strains in Eq. (26), the coupled local/non-local variation equation can be formulated by $$\Delta \delta \Pi = \int_{\Omega_b^0} \delta(F^{-1}\varepsilon)^T : (C^\sigma) : \Delta(F^{-1}\varepsilon) J^0 d\Omega + \tag{41}$$

$$\int_{\Omega_c^0} \delta(F^{-1}(\varepsilon + \pi \tilde{\varepsilon}))^T : (C^\sigma(d)) : \Delta(F^{-1}(\varepsilon + \pi \tilde{\varepsilon})) J^0 d\Omega +$$

$$\int_{\Gamma_d} \underbrace{[\![C^\sigma \cdot \nabla_s \hat{u} \cdot m]\!]}_{=0} \cdot \hat{u} \, d\Gamma +$$

$$\int_{\Omega_b^0 \cup \Omega_c^0} \delta(F^{-1}\tilde{\varepsilon})^T : C^\sigma(d) : \Delta(F^{-1}\tilde{\varepsilon}) J^0 d\Omega - \Delta l^{ext}$$

or in a general form $$\Delta \delta \Pi = \int_{\Omega^0} \delta(F^{-1}\tilde{\Theta}_h \varepsilon)^T : (C^\sigma(d)) : \Delta(F^{-1}\tilde{\Theta}_h \varepsilon) J^0 d\Omega + \tag{42}$$

$$\int_{\Omega^0} \delta(F^{-1}\tilde{\varepsilon})^T : C^\sigma(d) : \Delta(F^{-1}\tilde{\varepsilon}) J^0 d\Omega - \Delta l^{ext}$$

$$\tilde{\Theta}_h \varepsilon(\hat{u}) = \begin{cases} \varepsilon(\hat{u}) & \text{if } d = 0 \\ \varepsilon(\hat{u}) + \pi(X)\tilde{\varepsilon}(\hat{u}) & \text{otherwise} \end{cases} \tag{43}$$

Eq. (42) implies that local and non-local strain fields are decoupled but coexisting in the discretization model.

Substituting Eqs. (19) and (22) into Eq. (42) using the first-order meshfree convex approximation for $\phi^a(X)$ and zero-order strain smoothing function for $\tilde{\Psi}^b(X)$ and $\tilde{\Psi}^c(X)$ leads to the following regularized incremental discrete equations to be solved in the damage-induced strain localization analysis:

$$(\tilde{\tilde{K}}^M + \tilde{K})_{n+1}^\nu (\Delta \tilde{U})_{n+1}^{\nu+1} = R_{n+1}^\nu \tag{44}$$

where all the functions are computed in the $\nu$-th iteration during the $(n+1)$-th time incremental step. The modified material stiffness matrices $\tilde{\tilde{K}}^M$ using direct nodal integration (DNI) scheme is given by $$\tilde{\tilde{K}}_{IJ}^M = \int_{\Omega^0} \overline{B}_I^T C^\sigma \overline{B}_J J^0 d\Omega \stackrel{DNI}{=} \sum_{K=1}^{NP} \overline{B}_I^T(X_K) C^\sigma \overline{B}_J(X_K) J^0(X_K) V_K^0 \tag{45}$$

where $$\overline{B}_I(X) = \begin{cases} B_I(X) & \text{if } d = 0 \\ B_I(X) + \pi(X)\tilde{B}_I(X) & \text{otherwise} \end{cases} \tag{46}$$

$$B_I(X) = \begin{bmatrix} b_{I1}(X) & 0 \\ b_{I2}(X) & b_{I1}(X) \\ 0 & b_{I2}(X) \end{bmatrix} \tag{47}$$

$$\tilde{B}_I(X) = \begin{bmatrix} \tilde{b}_{I1}(X) & 0 \\ \tilde{b}_{I2}(X) & \tilde{b}_{I1}(X) \\ 0 & \tilde{b}_{I2}(X) \end{bmatrix} \tag{48}$$

Their components are $$b_{I1}(X) = \phi_{I,x}^a(X) \text{ and } b_{I2}(X) = \phi_{I,y}^a(X) \tag{49}$$

$$\tilde{b}_{I1}(X) = \alpha_{xx}(X)\phi_{I,xxx}^a(X) + 2\alpha_{xy}(X)\phi_{I,xxy}^a(X) + \alpha_{yy}(X)\phi_{I,xyy}^a(X) \tag{50}$$

$$\tilde{b}_{I2}(X) = \alpha_{xx}(X)\phi_{I,yxx}^a(X) + 2\alpha_{xy}(X)\phi_{I,yxy}^a(X) + \alpha_{yy}(X)\phi_{I,yyy}^a(X) \tag{51}$$

$$\alpha_{xx}(X) = \frac{1}{2} \sum_{J=1}^{NP} \Psi_J^c(X)(X_J - X)^2 \tag{52}$$

$$\alpha_{xy}(X) = \frac{1}{2} \sum_{J=1}^{NP} \Psi_J^c(X)(X_J - X)(Y_J - Y) \tag{53}$$

$$\alpha_{yy}(X) = \frac{1}{2} \sum_{J=1}^{NP} \Psi_J^c(X)(Y_J - Y)^2 \tag{54}$$

The stabilized stiffness counterpart $\tilde{K}_{IJ}$ using the direct nodal integration scheme can be expressed by $$\tilde{K}_{IJ} = \int_{\Omega^0} \tilde{B}_I^T C^\sigma \tilde{B}_J J^0 d\Omega \stackrel{DNI}{=} \sum_{K=1}^{NP} \tilde{B}_I^T(X_K) C^\sigma \tilde{B}_J(X_K) J^0(X_K) V_K^0 \tag{55}$$

where the first-order strain-gradient matrix $\tilde{B}_I$ is given by $$\tilde{B}_I(X) = \begin{bmatrix} \tilde{b}_{I1}(X) & 0 \\ \tilde{b}_{I2}(X) & \tilde{b}_{I1}(X) \\ 0 & \tilde{b}_{I2}(X) \end{bmatrix} \tag{56}$$

The components of the first-order strain-gradient matrix $\tilde{B}_I$ are $$\tilde{b}_{I1}(X) = \beta_x(X)\phi_{I,xx}^a(X) + \beta_y(X)\phi_{I,xy}^a(X) \tag{57}$$

$$\tilde{b}_{I2}(X) = \beta_x(X)\phi_{I,yx}^a(X) + \beta_y(X)\phi_{I,yy}^a(X) \tag{58}$$

$$\beta_x(X) = \sum_{J=1}^{NP} \Psi_J^b(X)(X_J - X) \tag{59}$$

$$\beta_y(X) = \sum_{J=1}^{NP} \Psi_J^b(X)(Y_J - Y) \tag{60}$$

Finally, the residual term along with the stabilized internal force term are expressed in a conventional way by $$R = f^{ext} - \tilde{\tilde{f}}^{int} - \tilde{f}^{stab} \tag{61}$$

where $f^{ext}$ is regular external force vector.

The internal force vector is computed by the direct nodal integration scheme as $$\tilde{\tilde{f}}_I^{int} = \int_{\Omega^0} \overline{B}_I^T \overline{\sigma} J^0 d\Omega \stackrel{DNI}{=} \sum_{K=1}^{NP} \overline{B}_I^T(X_K) \overline{\sigma}(X_K) J^0 V_K^0 \tag{62}$$

where $\overline{\sigma}^T = (\overline{\sigma}_{11}, \overline{\sigma}_{12}, \overline{\sigma}_{22})$ is the Cauchy stress for internal force calculation and is updated by $$\overline{\sigma}_{n+1} = \overline{\sigma}_n + \Delta\overline{\sigma}_{n+1} = \tag{63}$$
$$\begin{cases} \overline{\sigma}_n + (C^\sigma)_{n+1}(B)_{n+1} \Delta \tilde{U}_{n+1} & \text{if } d = 0 \\ \overline{\sigma}_n + (C^\sigma(d))_{n+1}\left((B)_{n+1} + \Delta \tilde{U}_{n+1} + \Delta\pi_{n+1}(\tilde{B})_{n+1}\tilde{U}_{n+1}\right) & \text{otherwise} \end{cases}$$

The stabilized force vector is also computed by direct nodal integration scheme as $$\tilde{f}_I^{stab} = \int_{\Omega^0} \tilde{B}_I^T \tilde{\sigma} J^0 d\Omega \stackrel{DNI}{=} \sum_{K=1}^{NP} \tilde{B}_I^T(X_K) \tilde{\sigma}(X_K) J^0 V_K^0 \tag{64}$$

where $\tilde{\sigma}^T = (\tilde{\sigma}_{11}, \tilde{\sigma}_{12}, \tilde{\sigma}_{22})$ is a vector containing the component of Cauchy stress associated with the stabilization and is updated by $$\tilde{\sigma}_{n+1} = \tilde{\sigma}_n + \Delta\tilde{\sigma}_{n+1} = \tilde{\sigma}_n + (C^\sigma)_{n+1}(\tilde{B})_{n+1} \Delta \tilde{U}_{n+1} \tag{65}$$

Figure 6:
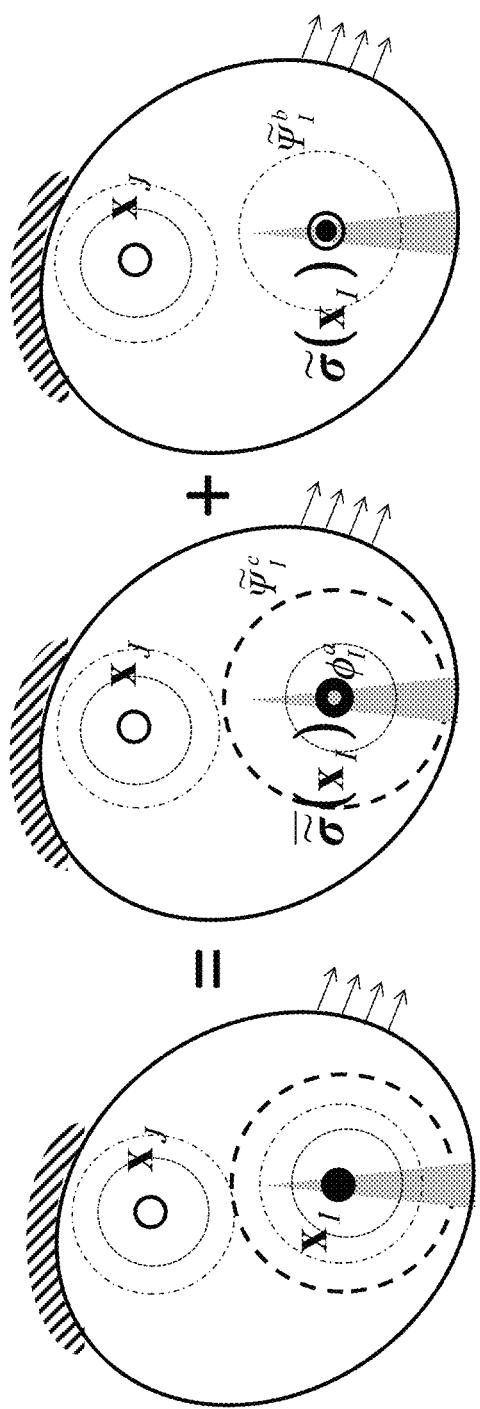
FIG. 6 is a diagram showing an example dual stress points in present meshfree nodal integration scheme for the damage induced strain localization problem according to an embodiment of the present invention.

The computation of Eq. (44) involves two stress points at each meshfree node, one for nodal stress $\overline{\sigma}$ with regularization effect as needed and the other for the enhanced nodal stress $\tilde{\sigma}$ for the necessary stabilization. This dual stress point integration scheme is illustrated in FIG. 6.

Figure 7:
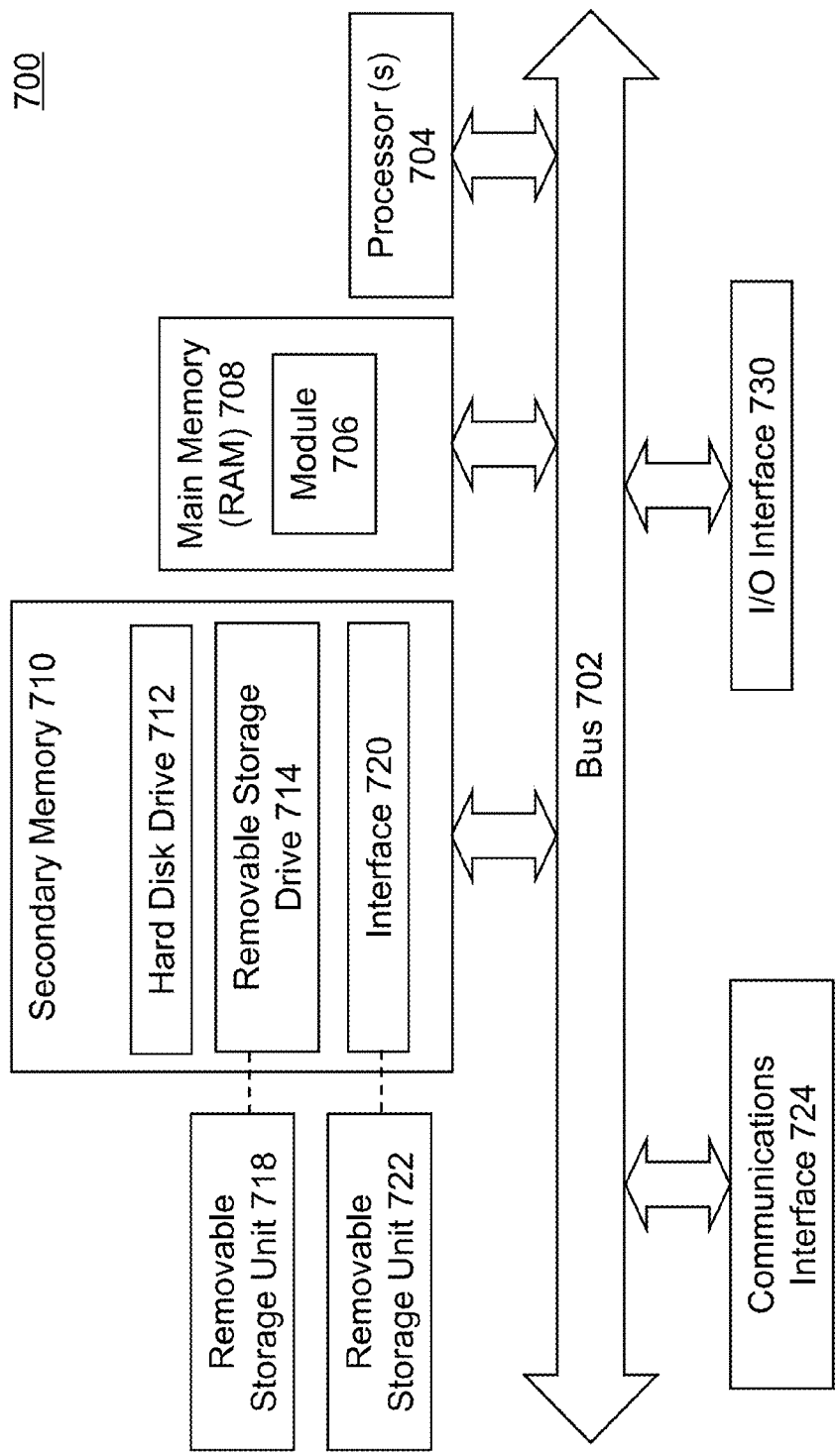
FIG. 7 is a function diagram showing salient components of an example computer system, in which an embodiment of the present invention may be implemented.

According to one aspect, the present invention is directed towards one or more computer systems capable of carrying out the functionality described herein. An example of a computer system 700 is shown in FIG. 7. The computer system 700 includes one or more processors, such as processor 704. The processor 704 is connected to a computer system internal communication bus 702. Various software embodiments are described in terms of this exemplary computer system. After reading this description, it will become apparent to a person skilled in the relevant art(s) how to implement the invention using other computer systems and/or computer architectures.

Computer system 700 also includes a main memory 708, preferably random access memory (RAM), and may also include a secondary memory 710. The secondary memory 710 may include, for example, one or more hard disk drives 712 and/or one or more removable storage drives 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc. which is read by and written to by removable storage drive 714. As will be appreciated, the removable storage unit 718 includes a computer readable medium having stored therein computer software and/or data.

In alternative embodiments, secondary memory 710 may include other similar means for allowing computer programs or other instructions to be loaded into computer system 700. Such means may include, for example, a removable storage unit 722 and an interface 720. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 722 and interfaces 720 which allow software and data to be transferred from the removable storage unit 722 to computer system 700. In general, Computer system 700 is controlled and coordinated by operating system (OS) software, which performs tasks such as process scheduling, memory management, networking and I/O services.

There may also be a communications interface 724 connecting to the bus 702. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc.

The computer 700 communicates with other computing devices over a data network based on a special set of rules (i.e., a protocol). One of the common protocols is TCP/IP (Transmission Control Protocol/Internet Protocol) commonly used in the Internet. In general, the communication interface 724 manages the assembling of a data file into smaller packets that are transmitted over the data network or reassembles received packets into the original data file. In addition, the communication interface 724 handles the address part of each packet so that it gets to the right destination or intercepts packets destined for the computer 700.

In this document, the terms "computer recordable storage medium", "computer recordable medium" and "computer readable medium" are used to generally refer to media such as removable storage drive 714, and/or a hard disk installed in hard disk drive 712. These computer program products are means for providing software to computer system 700. The invention is directed to such computer program products.

The computer system 700 may also include an input/output (I/O) interface 730, which provides the computer system 700 to access monitor, keyboard, mouse, printer, scanner, plotter, and alike.

Computer programs (also called computer control logic) are stored as application modules 706 in main memory 708 and/or secondary memory 710. Computer programs may also be received via communications interface 724. Such computer programs, when executed, enable the computer system 700 to perform the features of the present invention as discussed herein. In particular, the computer programs, when executed, enable the processor 704 to perform features of the present invention. Accordingly, such computer programs represent controllers of the computer system 700.

In an embodiment where the invention is implemented using software, the software may be stored in a computer program product and loaded into computer system 700 using removable storage drive 714, hard drive 712, or communications interface 724. The application module 706, when executed by the processor 704, causes the processor 704 to perform the functions of the invention as described herein.

The main memory 708 may be loaded with one or more application modules 706 that can be executed by one or more processors 704 with or without a user input through the I/O interface 730 to achieve desired tasks. In operation, when at least one processor 704 executes one of the application modules 706, the results are computed and stored in the secondary memory 710 (i.e., hard disk drive 712). The status of the time-marching simulation (e.g., simulated structural behaviors, etc.) is reported to the user via the I/O interface 730 either in a text or in a graphical representation.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, whereas two-dimensional structure has been shown and described for illustrating simplicity, the present invention can be applied to a three-dimensional structure to accomplish the same. In summary, the scope of the invention should not be restricted to the specific exemplary embodiments disclosed herein, and all modifications that are readily suggested to those of ordinary skill in the art should be included within the spirit and purview of this application and scope of the appended claims.

I claim:

1. A method of obtaining numerically simulated structural behaviors of brittle material comprising:
    receiving, in a computer system having a meshfree-method application module installed thereon, a meshfree model containing a plurality of particles to represent a structure made of brittle material subjected to cracks; and
    conducting, with the meshfree-method application module, a numerical time-marching simulation based on damage mechanics for a plurality of solution cycles using the meshfree model, at each non-initial solution cycle, performing following operations:
    a) determining one or more damage zones in the structure from simulated structural behaviors obtained in immediate prior solution cycle;

b) dividing the particles of the meshfree model into a first group representing said one or more damage zones and a second group representing remaining particles of the meshfree model;

c) applying a meshfree regularization scheme by modifying each particle's strain field of the first group with a morphing function that ensures a homogeneous jump condition along respective borders of said one or more damage zones; and e) obtaining structural behaviors of the structure using a meshfree stabilization scheme that applies to all of the particles' strain field.

2. The method of claim 1, wherein each of the one or more damage zones represents a crack that can grow over time.

3. The method of claim 2, wherein said morphing function is continuous within said each of the one or more damage zones.

4. The method of claim 3, wherein said morphing function has a zero value along each of said borders.

5. The method of claim 1, wherein the meshfree stabilization scheme comprises a stabilization force vector to compensate results caused by zero-energy modes.

6. The method of claim 1, further comprises assigning, with the meshfree-method application module, a domain of influence or support to each of the particles.

7. A system for obtaining numerically simulated structural behaviors of brittle material comprising:
    a main memory for storing computer readable code for a meshfree-method application module configured to perform a numerical simulation based on meshfree method;
    at least one processor coupled to the main memory, said at least one processor executing the computer readable code in the main memory to cause the meshfree-method application module to perform following operations:
        receiving a meshfree model containing a plurality of particles to represent a structure made of brittle material subjected to cracks; and
        conducting, with the meshfree-method application module, a numerical time-marching simulation based on damage mechanics for a plurality of solution cycles using the meshfree model, at each non-initial solution cycle, performing following operations:
        a) determining one or more damage zones in the structure from simulated structural behaviors obtained in immediate prior solution cycle;
        b) dividing the particles of the meshfree model into a first group representing said one or more damage zones and a second group representing remaining particles of the meshfree model;
        c) applying a meshfree regularization scheme by modifying each particle's strain field of the first group with a morphing function that ensures a homogeneous jump condition along respective borders of said one or more damage zones; and
        e) obtaining structural behaviors of the structure using a meshfree stabilization scheme that applies to all of the particles' strain field.

8. The system of claim 7, each of the one or more damage zones represents a crack that can grow over time.

9. The system of claim 8, wherein said morphing function is continuous within said each of the one or more damage zones.

10. The system of claim 9, wherein said morphing function has a zero value along each of said borders.

11. The system of claim 7, wherein the meshfree stabilization scheme comprises a stabilization force vector to compensate results caused by zero-energy modes.

12. The system of claim 7, further comprises assigning a domain of influence or support to each of the particles.

13. A non-transitory computer readable storage medium containing instructions for obtaining numerically simulated structural behaviors of brittle material by a method comprising:
    receiving, in a computer system having a meshfree-method application module installed thereon, a meshfree model containing a plurality of particles to represent a structure made of brittle material subjected to cracks; and
    conducting, with the meshfree-method application module, a numerical time-marching simulation based on damage mechanics for a plurality of solution cycles using the meshfree model, at each non-initial solution cycle, performing following operations:
        a) determining one or more damage zones in the structure from simulated structural behaviors obtained in immediate prior solution cycle;
        b) dividing the particles of the meshfree model into a first group representing said one or more damage zones and a second group representing remaining particles of the meshfree model;
        c) applying a meshfree regularization scheme by modifying each particle's strain field of the first group with a morphing function that ensures a homogeneous jump condition along respective borders of said one or more damage zones; and
        e) obtaining structural behaviors of the structure using a meshfree stabilization scheme that applies to all of the particles' strain field.

14. The non-transitory computer readable storage medium of claim 13, each of the one or more damage zones represents a crack that can grow over time.

15. The non-transitory computer readable storage medium of claim 14, wherein said morphing function is continuous within said each of the one or more damage zones.

16. The non-transitory computer readable storage medium of claim 15, wherein said morphing function has a zero value along each of said borders.

17. The non-transitory computer readable storage medium of claim 13, wherein the meshfree stabilization scheme comprises a stabilization force vector to compensate results caused by zero-energy modes.

18. The non-transitory computer readable storage medium of claim 13, further comprises assigning, with the meshfree-method application module, a domain of influence or support to each of the particles.

* * * * *